(12) United States Patent
Doliwa

(10) Patent No.: US 10,505,732 B2
(45) Date of Patent: Dec. 10, 2019

(54) METHOD FOR GENERATING A PUBLIC/PRIVATE KEY PAIR AND PUBLIC KEY CERTIFICATE FOR AN INTERNET OF THINGS DEVICE

(71) Applicant: NXP B.V., Eindhoven (NL)

(72) Inventor: Peter Doliwa, Hamburg (DE)

(73) Assignee: NXP B.V., Eindhoven (NL)

( * ) Notice: Subject to any disclaimer, the term of this patent is extended or adjusted under 35 U.S.C. 154(b) by 187 days.

(21) Appl. No.: 15/676,085

(22) Filed: Aug. 14, 2017

(65) Prior Publication Data
US 2019/0052464 A1 Feb. 14, 2019

(51) Int. Cl.
H04L 29/06 (2006.01)
H04L 9/32 (2006.01)
H04L 29/08 (2006.01)
H04W 4/70 (2018.01)

(52) U.S. Cl.
CPC ............ H04L 9/3213 (2013.01); H04L 29/08 (2013.01); H04L 63/0807 (2013.01); H04W 4/70 (2018.02)

(58) Field of Classification Search
USPC .......................................................... 726/10
See application file for complete search history.

(56) References Cited

U.S. PATENT DOCUMENTS

| | | | | |
|---|---|---|---|---|
| 7,039,816 B2 * | 5/2006 | Kocher | ................ | G06Q 20/367 380/240 |
| 7,283,629 B2 * | 10/2007 | Kaler | .................... | H04L 9/0838 380/259 |
| 8,548,171 B2 * | 10/2013 | McGrew | ................ | H04L 9/0833 380/259 |
| 9,043,604 B2 | 5/2015 | Brickell et al. | | |
| 9,100,189 B2 | 8/2015 | Hartley et al. | | |
| 9,712,503 B1 * | 7/2017 | Ahmed | ................ | H04L 63/0435 |
| 9,742,562 B2 * | 8/2017 | Nix | ........................ | H04W 4/70 |

(Continued)

FOREIGN PATENT DOCUMENTS

GB 2543096 A 4/2017

OTHER PUBLICATIONS

U.S. Appl. No. 15/377,840, First Named Inventor: Jan Rene Brands, for "Distributed Cryptographic Key Insertion and Key Delivery", filed Dec. 13, 2016.

(Continued)

Primary Examiner — Amare F Tabor
(74) Attorney, Agent, or Firm — Daniel D. Hill

(57) ABSTRACT

A method is provided for generating a key pair and certificate for an IoT device. An integrated circuit (IC) is manufactured by a first entity for use in an internet of things (IoT) device. The IC is provided to a second entity for manufacturing the IoT device using the IC, the IC having a unique identifier (UID) and secret key derivation data (KDD). A secure memory is provided to a third entity by the first entity. The secure memory has secret key derivation parameters configured to enable the generation of a product specific parameter (PSP). The secure memory enables the third entity to prepare a signed public key certificate using the UID assigned to the IC of each device. The public key certificate is for verifying the authenticity of the device. In addition, the PSP enables the IC inside the device to generate a private key corresponding to a public key in the signed public key certificate.

17 Claims, 3 Drawing Sheets

(56) References Cited

U.S. PATENT DOCUMENTS

| | | | | |
|---|---|---|---|---|
| 9,819,485 B2* | 11/2017 | Chastain | ............... | H04W 12/04 |
| 10,079,677 B2* | 9/2018 | Benson | ................ | H04L 9/0861 |
| 2011/0010770 A1 | 1/2011 | Smith et al. | | |
| 2014/0025950 A1 | 1/2014 | Peeters et al. | | |
| 2016/0218875 A1* | 7/2016 | Le Saint | ............... | H04L 9/0822 |
| 2017/0048070 A1 | 2/2017 | Gulati et al. | | |
| 2017/0170957 A1* | 6/2017 | Smith | ................... | H04W 12/04 |
| 2017/0338948 A1* | 11/2017 | Boehl | ................... | H04L 9/0891 |

OTHER PUBLICATIONS

U.S. Appl. No. 15/641,480, First Named Inventor: Jan Rene Brands, for "Method For Generating A Public/Private Key Pair and Public Key Certificate For An Internet of Things Device," filed Jul. 5, 2017.

* cited by examiner

METHOD FOR GENERATING A PUBLIC/PRIVATE KEY PAIR AND PUBLIC KEY CERTIFICATE FOR AN INTERNET OF THINGS DEVICE

BACKGROUND

Field

This disclosure relates generally to integrated circuits and more specifically to a method for generating a public/private key pair and a public key certificate for an internet of things (IoT) device incorporating an integrated circuit (IC).

Related Art

An asymmetric cryptography system uses a public and private key pair for authentication or to encrypt and decrypt data. In the asymmetric cryptography system, a public key certificate is generated and a trusted party signs the certificate. Many secure network protocols use asymmetric cryptography that does not require the distribution of secret information in advance for verifying communication peers. Instead, certificates signed by a certificate authority are used that only contain public information. Compared to using symmetric cryptography this has the advantage that the initial setup of the security infrastructure is much easier and there is no single point of failure inside the infrastructure that can be attacked to gain knowledge of the individual secret information of all peers. In many Internet of Things (IoT) systems, each device in the system using asymmetric cryptography needs to have a signed public-key certificate. When signing certificates for a device during manufacturing, the signing authority typically needs a secure method to verify that it only signs public keys of valid devices and these public keys match the private key only known to the device itself.

Typical existing solutions for key provisioning and verifying the correct manufacturing of devices require a permanent internet connection and provisioning servers in a secure environment or they require the use of integrated circuits (IC) individually customized for the customer. Also, key provisioning typically requires a trusted relationship between the IC manufacturer and the customer. Generating a public key pair can be a relatively complex process that requires adequate security measures. It usually involves generating one or more random numbers suitable for cryptographic applications. Generating a random number is quite complicated to perform correctly and typically requires a True Random Number Generator (TRNG). Low-cost ICs for IoT systems are often not equipped with a suitable TRNG for cost reasons.

Especially in the context of the IoT market where devices are built using standard integrated circuits delivered through distributors and where device manufacturing is usually outsourced to contract manufacturers the existing solutions for key provisioning are problematic or not usable at all. The use of uncustomized ICs means the provisioning and security configuration have to take place during manufacturing, while the use of contract manufacturing means these security sensitive procedures are the responsibility of untrusted third parties, which raises the question how to make sure and how to verify that no illicit tampering by these parties is possible.

Therefore, a need exists for a method to generate a public/private key pair and a signed public key certificate that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
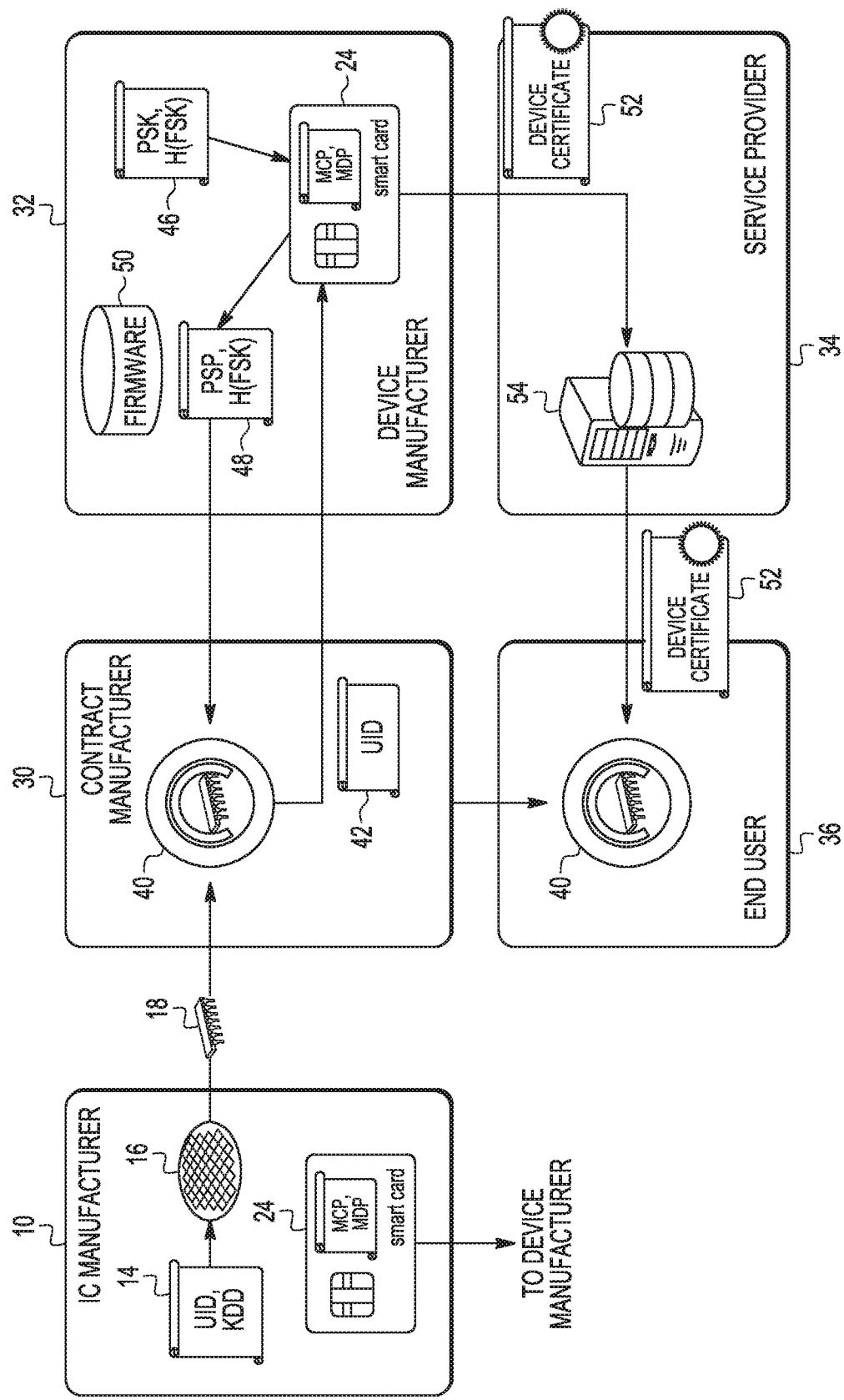
FIG. 1 illustrates a method for generating a public/private key pair and public key certificate for an IoT device.

Generally, there is provided, a method for generating a public/private key pair and signed public key certificate for an IoT device. In one embodiment, a multi-party shared secret generation algorithm (namely elliptic curve Diffie-Hellman (ECDH) but any other algorithm can be used as well) is used. A shared secret is securely created on a manufactured IoT device in an untrusted contract manufacturing environment, while the same shared secret is created at the IoT device manufacturer. The shared secret is kept confidential from the IC manufacturer, the contract manufacturers, and any other third party. More, specifically, an integrated circuit (IC) manufacturer loads a unique identifier (UID) and secret key derivation data (KDD) onto an IC to be used in the IoT device. The IC manufacturer also prepares a secure memory, such as a smartcard, having a manufacturer configuration parameter (MCP) and a manufacturer diversification parameter (MDP) related to the ICs being manufactured. The prepared smartcard is provided to a device manufacturer of an IoT device that will include the IC. To build the IoT product, the device manufacturer may outsource some or all of the production to a contract manufacturer. During development of the IoT device, firmware for the device is created and signed using an asymmetric key pair having a private firmware signing key and a public firmware signature verification key (FSK). To set up an outsourced manufacturing process, the IoT device manufacturer calculates a product specific parameter (PSP) based on the parameters on the smartcard. The firmware, the firmware signature verification key and the PSP, are provided to the contract manufacturer. During manufacturing, in the unsecure contract manufacturer's environment, the IC uses the provided PSP and the firmware signature verification key as inputs for deriving a private key from the IC's individual secret key derivation data (KDD). After manufacturing, the contract manufacturer provides a list of the UIDs of the ICs used in production to the device manufacturer. Using the list of UIDs, information on the smartcard, a product specific key (PSK), and a hash of a firmware signature verification key, the IoT device manufacturer calculates a public key certificate for each IoT device. The certificates only include publicly available information and so the certificates may be loaded to a database for distribution.

The method provides a secure approach to provision ICs for IoT devices that use un-customized "off-the-shelf" ICs to allow provisioning of an IoT device in an unsecure environment by untrusted third parties, as well as distribution over standard distribution channels.

In accordance with an embodiment, there is provided, a method including: manufacturing, by a first entity, an integrated circuit (IC) for use in a device; providing the IC to a second entity for manufacturing the device using the IC, the IC having a unique identifier (UID) and secret key derivation data (KDD); and providing a secure memory to a third entity, the secure memory having secret key derivation parameters configured to enable the generation of a product specific parameter (PSP), the PSP for being uploaded to the IC. The secure memory enables the third entity to prepare one of a signed public key certificate or a certificate signing request using the UID. The PSP enables the IC to generate a private key, and wherein the public key certificate and the private key for verifying the authenticity of the device, wherein the first, second, and third entities are different entities. The secret key derivation parameters may include a manufacturer configuration parameter (MCP) and a manufacturer diversification parameter (MDP). Providing a secure memory may further comprise the secure memory further enabling the third entity to generate the PSP using an additional secret key derivation parameter that is unknown to the first entity. The third entity may be a device manufacturer and the second entity may be a contract manufacturer of the device, wherein the device may be characterized as being an internet of things device. The method may further include: enabling the receipt of a device configuration parameter arranged to generate the private key inside the IC, arranged to generate the private key inside the secure memory, and arranged to generate the signed public key certificate; and enabling the storage of the device configuration parameter inside the secure memory and inside the IC. The method may further include: using a firmware signature verification key (FSK) to verify firmware for the device; using the FSK as an input parameter for generation of the private key; and using the FSK for the generation of the signed public key certificate. Enabling the storage of the device configuration parameter inside the IC may further include burning fuses in the IC for storing the device configuration parameter. The device configuration parameter may be used for the generation of the signed public key certificate, and the device configuration parameter may be used in the device for one or more of enabling/disabling a debug mode, enabling/disabling a secure boot, enabling/disabling encryption of a memory element, and enabling/disabling a modification of device configuration. The method may further comprise making the signed public key certificate available on a database. The secure memory may be characterized as being one of a smartcard or a hardware security module (HSM). The UID may be determined using the KDD and a private key known only to the first entity. The method may further include: digitally signing, by the first entity, the UID; and enabling the secure memory to verify the UID by verifying a signature. The secret key derivation parameters may be characterized as being elliptic curve key pairs and the method used to generate the private key may be characterized as being elliptic curve Diffie-Hellman.

In another embodiment, there is provided, a method including: manufacturing, by a first entity, an integrated circuit (IC) for use in a device, the IC having a unique identifier (UID) and secret key derivation data (KDD); providing the IC to a second entity for manufacturing the device using the IC, the IC being enabled by the first entity to generate a private key based on the KDD and a product specific parameter (PSP), the PSP being provided by a third entity; and enabling the third entity to prepare one of a signed public key certificate or certificate signing request using the UID, the signed public key certificate corresponding to the private key, wherein the first, second, and third entities are different entities. The method of claim 14 may further include: digitally signing, by the first entity, the UID; and enabling the second entity to verify the UID by verifying a signature loaded in a secure memory. The third entity may be a device manufacturer and the second entity may be a contract manufacturer of the device manufacturer, and wherein the device is characterized as being an internet of things (IoT) device. The method may further include: enabling receipt of a device configuration parameter arranged to generate the private key inside the IC, arranged to generate the private key inside a secure memory, and arranged to generate the signed public key certificate; and enabling the storage of the device configuration parameter inside the secure memory and inside the IC. The method may further include: using a firmware signature verification key (FSK) to verify firmware for the device; using the FSK as an input parameter for generation of the private key; and using the FSK for the generation of the signed public key certificate. Enabling the storage of the device configuration parameter inside the IC further includes burning fuses in the IC for storing the device configuration parameter. The device configuration parameter may be used for the generation of the signed public key certificate, and the device configuration parameter may be used in the device for one or more of enabling/disabling a debug mode, enabling/disabling a secure boot, enabling/disabling encryption of a memory element, and enabling/disabling a modification of device configuration.

FIG. 1 illustrates a method for generating a public/private key pair and public key certificate for an IoT device in accordance with an embodiment. FIG. 1 illustrates an IC manufacturing environment 10, a contract manufacturing environment 30, an IoT device manufacturing environment 32, a service provider 34, and an end user 36. In IC manufacturing environment 10, a first entity, i.e. an IC manufacturer, provides a wafer 16 including a plurality of IC die. Each of the die is loaded with a UID and KDD 14 and provided to a second entity, i.e., a contract manufacturer. The UID is digitally signed by the IC manufacturer. The die may be provided to the contract manufacturer directly by the IC manufacturer, by a distributor, or by the IoT device manufacturer. Also, a secure memory 24 is loaded with an initial secret device security derivation parameters such as a MCP and MDP to a third entity, i.e., an IoT device manufacturer. Secure memory 24 may be part of a secure device suitable for guaranteeing that the private key is only ever used temporarily for generating the certificate and is deleted immediately afterwards. A secure device incorporating secure memory 24 may be implemented in software, hardware, or a combination of hardware and software. Examples of a suitable secure device include a smartcard, a secured hard disk drive, or the like. The secured hard disk drive may be part of a fully programmable secure device that can run customized computations and that includes a hardware security module (HSM). Also, secure memory 24 may be provided as part of a certificate generation toolchain used to generate the certificates. The IC manufacturer inserts the initial chip-individual secret and unique identifier (UID) into IC 18 during, for example, wafer testing. A plurality of IC die are singulated from wafer 16, packaged, and tested. The completed ICs, such as IC 18, are provided to contract manufacturing environment 30.

In IoT device manufacturing environment 32 the IoT device manufacturer receives a customer specific secret from the IC manufacturer and may add a further secret product specific key (PSK) to diversify the resulting keys. For example, the further secret PSK is unknown to the IC manufacturer and enables the generation of a PSP that is therefore also unknown to the IC manufacturer. Using the logged UIDs 42 as input, the IoT device manufacturer calculates the same device individual secret as the IC. With the same parameters derived from the IC security configuration, for example the FSK, the IoT device manufacturer derives the same asymmetric key pair inside a secured environment, e.g. inside smart card 24, a certificate generation toolchain, or the like. A product specific key (PSK) and a hash of a firmware signature verification key (FSK) 46 are included on smart card 24 by the IoT device manufacturer. The IoT device manufacturer calculates a product specific parameter (PSP), hash of the FSK (H(FSK) for each type of device, and a public key certificate 52 for each IoT device. The calculated PSP, H(FSK) 48 are provided to the contract manufacturer. Firmware 50 is also provided to the contract manufacturer for uploading to each device. Using compiled information 48 and additional parameters derived from the device security configuration parameters in a key derivation function (KDF) an asymmetric key pair is generated by using the KDF. The UIDs of produced devices are collected in a list of UIDs 42 by the contract manufacturer and sent to the IoT device manufacturer and loaded in secure memory 24. The contract manufacturer uses the public/private key provisioned ICs in the manufacture of IoT devices 40. The IoT device manufacturer uses the collected UIDs 42 from the contract manufacturer to generate the same key pair as is generated by IC 18. The public key from the key pair is then used to create a certificate 52 for the manufactured IoT device. The IoT device manufacturer collects and stores the created certificates 52 for delivery to the IoT device 58 at a later time. The certificates 52 only include publicly available information and so may be loaded to a database for distribution. Distribution can be easily accomplished by uploading the certificates 52 to a public server 54 by service provider 34. The IoT device 40 can then obtain its certificate 52 when it is connected to a network for the first time when at end user 36.

Figure 2:
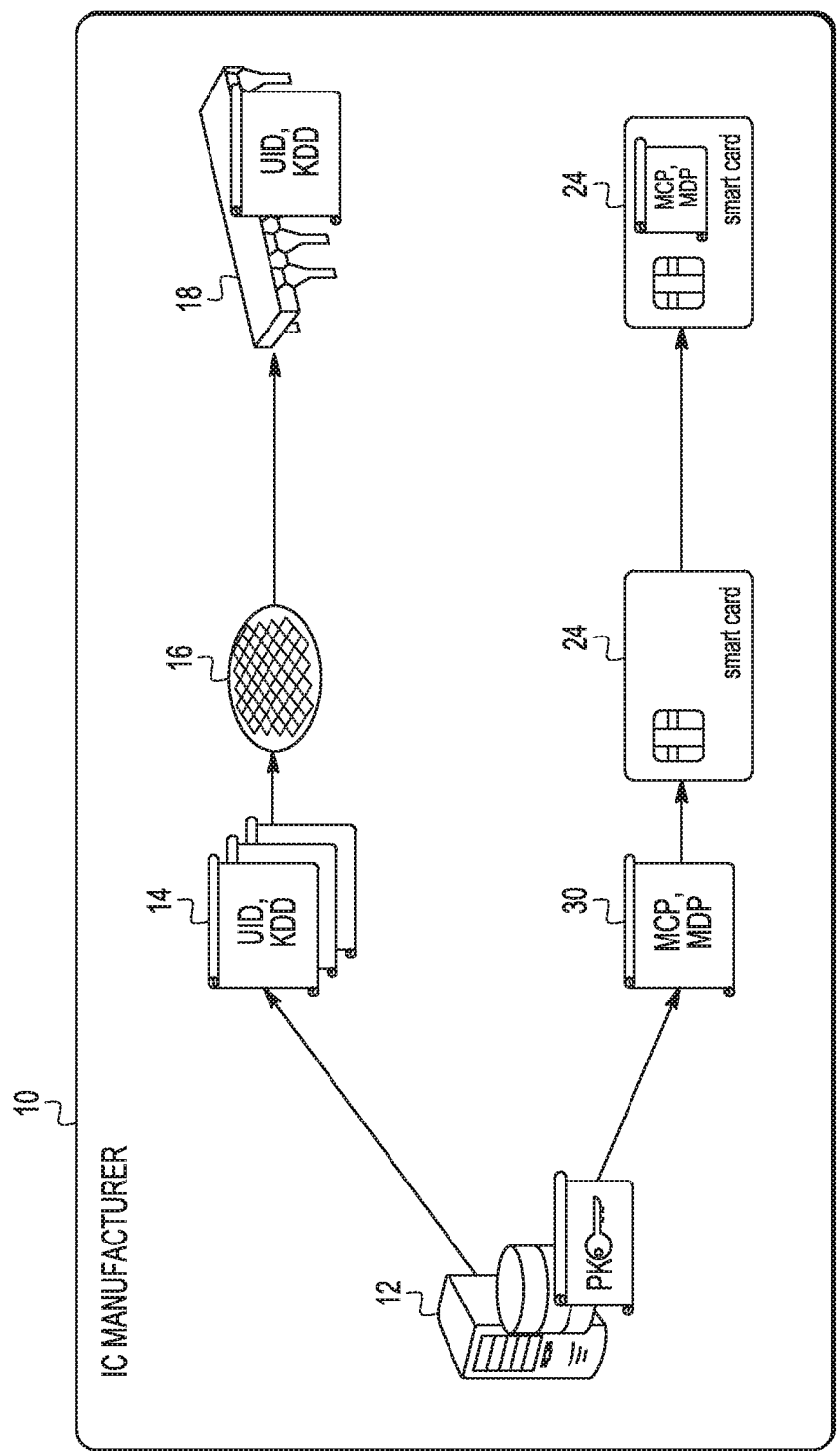
FIG. 2 illustrates the IC manufacturing environment portion of the method of FIG. 1 in more detail.

FIG. 2 illustrates a portion of the method of FIG. 1, relating to IC manufacturing environment 10, in more detail. In one embodiment, a private key pair (PK) is kept secret by the IC manufacturer and may be used to protect the generation of the shared secret generation parameters for the manufactured ICs and for secure memory 24 so that only the IC manufacturer is able to generate valid parameters for the shared secret calculation. An elliptic curve private key KDD and public key UID 14 are inserted into each die of wafer 16 during wafer testing. Also, secure memory 24, such as a smartcard, is loaded with initial secret device security configuration parameters such as a MCP and MDP. A plurality of IC die are singulated from wafer 16, packaged, and tested. The completed ICs, such as IC 18, are provided to contract manufacturing environment 30. Smart card 24 is provided to the IoT device manufacturer.

Figure 3:
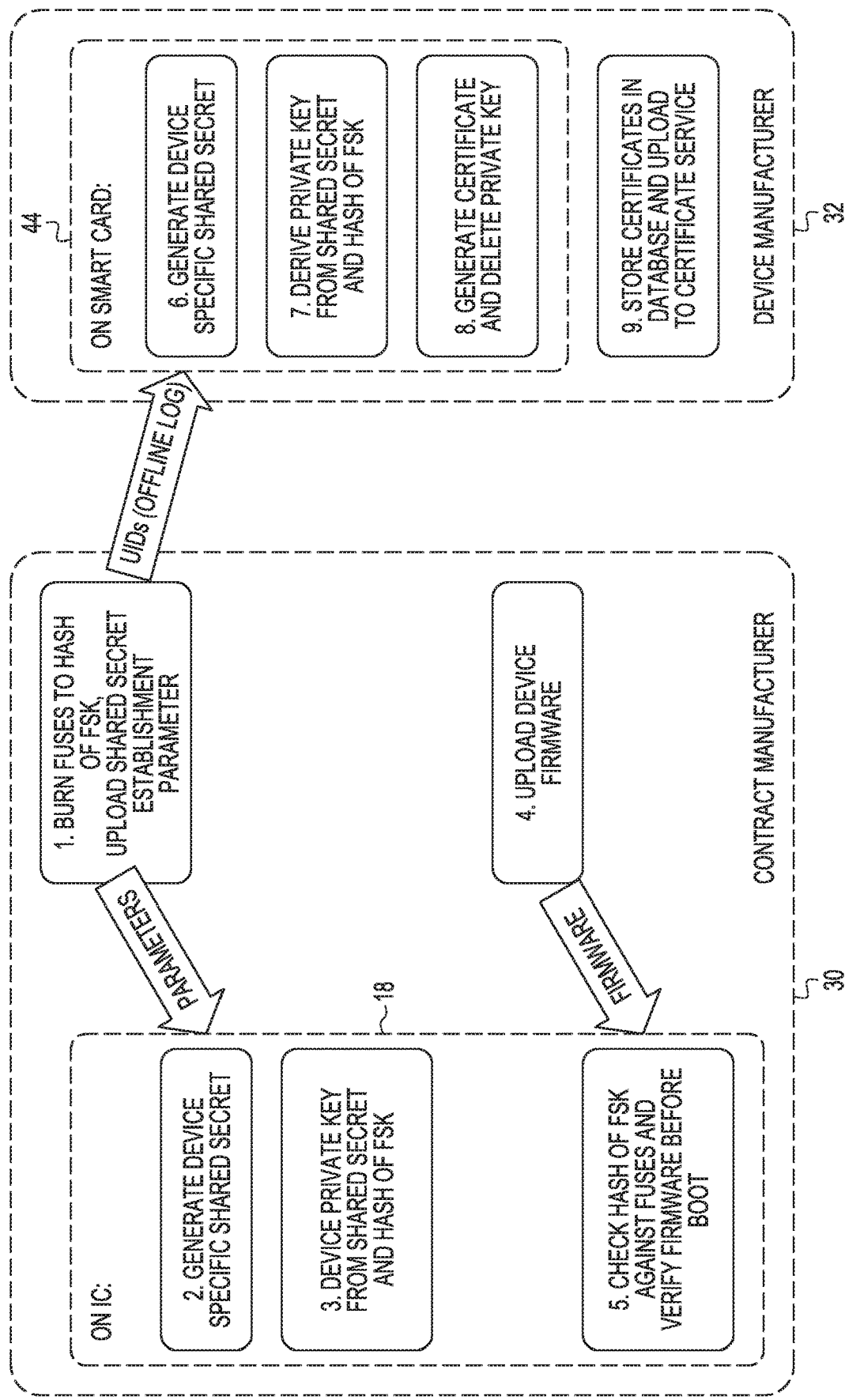
FIG. 3 illustrates a method for key derivation and certificate generation in accordance with an embodiment.

FIG. 3 illustrates a method for key derivation and certificate generation in accordance with an embodiment. In step 1, at the contract manufacturer 30, fuses are burned on ICs 18 to program the hash of the FSK. In another embodiment, the hash of the FSK may be stored in a different type of non-volatile memory. Another embodiment may store the FSK without hashing. Also, in another embodiment, a firmware signature verification root key may only be used for verifying the actual firmware signature verification key. Continuing with FIG. 3, a shared secret establishment parameter PSP is loaded unto the ICs. A simple setup is achieved by creating a shared secret between a chip individual asymmetric key pair inserted into the IC by the IC manufacturer and a key pair chosen by the IoT device manufacturer without using a key pair prepared for the IoT device manufacturer by the IC manufacturer. Then the parameter needed for the shared secret calculation on the device is simply the public key chosen by the IoT device manufacturer. Since this parameter is static for a range of devices the contract manufacturer can manufacture devices without any communication between its manufacturing site and the IoT device manufacturer.

In step 2, on IC 18, a device specific shared secret (DSK) is generated. In step 3, a private key is derived from the shared secret and the hash of the FSK.

In the case of ECDH for the calculation of the shared secret, an IC manufacturer chooses public system parameters including a large prime p, an elliptic curve $E(\mathbb{Z}_p)$ of order n (prime), and a generator $G \in_{\mathcal{R}} E(\mathbb{Z}_p)$. An elliptic curve private key $KDD \in_{\mathcal{R}} \mathbb{Z}_n$ is inserted into each IC by the IC manufacturer. The matching public key is then UID:= KDD·G. The IoT device manufacturer chooses a private key $PSK \in_{\mathcal{R}} \mathbb{Z}_n$ and sends the matching public key PSP:=PSK·G to the contract manufacturer, which might be delivered as part of the device firmware or separately. On each device the IC will calculate its individual shared secret DSK:= KDD·PSP. The IoT device manufacturer calculates the same shared secret using the collected UIDs using the formula DSK:=PSK·UID.

Additional features can be implemented by adding more key pairs into the shared secret calculation. An additional IoT device manufacturer specific key pair (MCP, MDP) could be generated by the IC manufacturer to be able to distribute preconfigured smart cards or HSMs to IoT device manufacturers that are diversified with the key pair selected by the IoT device manufacturer. Then, another key pair (PK), kept secret by the IC manufacturer, could be used to protect the shared secret generation parameters for the ICs and for the smart cards or HSMs so that only the IC manufacturer is able to generate valid parameters for the shared secret calculation. The UID of an IC would then be calculated before inserting it into the IC using the formula UID:=KDD·(PK·G), where PK is the additional private key kept secret by the IC manufacturer. The public part of the MDP would then be calculated using the formula MDP:= MCP·(PK·G). The public value PSP needed by the IC to calculate its shared secret would then be calculated using the formula PSP:=PSK·MDP.

When using more than two key pairs, intermediate Diffie-Hellman values are exchanged instead of the public keys of both sides. This makes it possible to verify UIDs implicitly instead of using a signature. Because the private key PK used to create the intermediate value, which is used as the UID, is only known to the IC manufacturer, only UIDs generated by the IC manufacturer can be used in the shared secret calculation. Alternatively, UIDs could be protected by a signature generated by the IC manufacturer so that the validity of UIDs could be validated by verifying the signature using a certificate distributed by the IC manufacturer. Using the implicit UID verification saves the storage space that would be needed for the signature and increases the control over the system for the IC manufacturer. Alternately, the UID may be determined using the KDD and a private key known only to the IC manufacturer.

A device individual asymmetric key pair is generated by the IC and at the IoT device manufacturer. The generation of the asymmetric key pair depends on the asymmetric algorithm and is straight forward for elliptic curve private key generation where the private key is just a randomly chosen field element. Any key derivation function can be used to derive the private key from the shared secret. Generating other key types such as for example RSA is also possible by using the output of the key derivation function as input for a PRNG that is used as input for an RSA key pair generation algorithm. In the case of deriving an elliptic curve private key the following formula could be used ECpriv:=KDF (DSK,hash(FSK))(mod n) where FSK is the firmware signing verification root key and DSK is the device specific shared secret. The simplest KDF to be used is a plain cryptographic hash over the input parameters, but any other KDF can be used as well.

In step 4, the contract manufacturer uploads firmware 50 to each of ICs 18.

In step 5, the IC checks the hash of the FSK against the fuses that were blown in step 1 and verifies the firmware prior to boot. Further device configuration values can be added by hashing the values using the concatenation of the hash of the FSK and the hash of the configuration values as input for the KDF. The configuration of the root of trust and of the device security settings is the responsibility of untrusted contract manufacturers. Therefore, a malicious contract manufacturer could upload a manipulated firmware during production that could be used to extract secrets, to create backdoors, to spy on end users, to create bot nets and for other malicious means. To prevent this kind of manipulation the cryptographic hash of the firmware signing verification root key used by the IoT device manufacturer to sign its device firmware is used as a parameter for the key derivation function used to generate the private key. Devices that are incorrectly configured by the untrusted third parties will not be able to generate the same private key as the IoT device manufacturer and will not receive a certificate matching their key pair and thus will not be able to authenticate. Other security critical parameters (e.g. debug settings, settings enabling security functions) could be hashed and used as parameter for the key derivation function as well.

Several approaches for detecting manipulated devices could be used. During integration into a service infrastructure the possession of the expected private key could be checked before delivery of the certificate. Another alternative possibility is to ask the contract manufacturers to send a challenge to the devices during manufacturing, to collect the responses to the challenges, and to send them to the IoT device manufacturer for verification together with the collected UIDs needed for certificate generation. The collected information could also be used for production control.

Still referring to FIG. 3, steps 6 and 7 are similar to steps 2 and 3 except that they are performed using smartcard 24 at the IoT device manufacturer instead of on IC 18, and the UID is used to calculate the same shared secret instead of the PSP. At step 6, the public keys that are also used as UIDs are collected and sent to the IoT device manufacturer where the same shared secret is generated. To make sure the private key and the shared secrets stay confidential this could be done on a secured device like smart card 24 or an HSM inside a secured environment at the IoT device manufacturer. At step 7, the private key is derived from the shared secret and hash of the FSK.

In step 8, the IoT device manufacturer generates a certificate and deletes the private key. Because the same key pair as on the device is calculated at the IoT device manufacturer, the IoT device manufacturer knows the identity of the device and the corresponding key pair and can verify the UID either implicitly or explicitly. In one embodiment, secure memory 24 may be enabled to verify the UID by verifying a signature. Based on the verified identity the IoT device manufacturer creates certificate 52 for IoT device 40 that can be stored in, for example, database 54 for distribution as shown in step 9. The certificate only comprises public information so it can be easily distributed using public certificate services or during integration into a service infrastructure or any other means.

Alternately, instead of directly creating certificate 52 in step 8, the IoT device manufacturer could also create a signing request and send it to a certificate authority for signing. Since the private key is also generated at the IoT device manufacturer the protection of the certificate generation environment is important. When smart card 24 is used for certificate generation, the smart card firmware could make sure that generated private keys are only used as temporary intermediate values for public key creation and are not usable for any other purpose without completely breaking smart card 24 and that the private keys are deleted immediately after use. The same considerations apply to the usage of a secured hard disk drive (HSM) or other means for protecting key generation. A device configuration parameter may be used for the generation of the signed public key certificate. Also, the device configuration parameter may be used in the IoT device for one or more of enabling/disabling a debug mode, enabling/disabling a secure boot, enabling/disabling encryption of a memory element, and enabling/disabling a modification of device configuration.

To improve the security of the generated device against compromise additional random data could be introduced into the key derivation. This random data could be generated by the IoT device, the IoT device manufacturer or a combination of both and transmitted encrypted using the shared secret. If the IoT device manufacturer introduces an additional random parameter, then the private key generation on the device has to be postponed until the encrypted random parameter is received. The encrypted random parameter could be delivered together with the certificate during integration of the device into the service infrastructure. The additional random parameters would be deleted after the key generation so that private keys would stay confidential even in case of a later compromise of the IoT device manufacturer.

The disclosed method provides a secure approach to provision device individual asymmetric keys and certificates to devices using uncustomized (i.e. off-the-shelf) ICs. The method allows distribution of the ICs over standard distribution channels where the customization and configuration of security properties is completely outsourced to untrusted third parties while still keeping provisioned keys confidential from distributors, contract manufacturers, competitors and even the IC manufacturer. This approach does not require a live internet connection that could lead to production interruptions and does not require a secured environment at contract manufacturing making it easy to integrate into typical manufacturing processes. Additionally, this approach does not require a good random number generator on the IC and all operations required on the IC or device itself are feasible on very resource constrained devices which is especially useful for the IoT market. The lack of a good source of random numbers could otherwise lead to bad quality device keys that are not entirely random which could be used for compromising the keys. The approach is flexible in respect to the types of generated keys and certificates to allow supporting different requirements of IoT device manufacturers or service infrastructures. Additionally, the method provides a means to detect IoT devices with invalid security configuration and prevents tampering by untrusted contract manufacturers and allows the IoT device manufacturer to tightly control the manufacture of IoT devices.

Since all secret values on the device itself are device specific an attacker extracting secrets from one device does not gain any information about any other device which greatly discourages any attempts to extract secrets. All secrets known by the IoT device manufacturer are specific to the IoT device manufacturer so an IoT device manufacturer that does not protect its secrets well enough does not pose any threat to other customers of the IC manufacturer.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   manufacturing, by a first entity, an integrated circuit (IC) for use in a device;
   providing, by the first entity, the IC to a second entity for manufacturing the device using the IC,
   the IC having a unique identifier (UID) and secret key derivation data (KDD); and providing a secure memory to a third entity, the secure memory having secret key derivation parameters configured to enable the generation of a product specific parameter (PSP), the PSP for being uploaded to the IC,
   wherein the secure memory enables the third entity to prepare one of a signed public key certificate or a certificate signing request using the UID, wherein the PSP enables the IC to generate a private key, and wherein the public key certificate and the private key for verifying the authenticity of the device, wherein the first, second, and third entities are different entities, and wherein the secure memory is separate from both the IC and the device;
   the method further comprising enabling the receipt of a device configuration parameter arranged to generate the private key inside the IC, arranged to generate the private key inside the secure memory, and arranged to generate the signed public key certificate; and
   enabling the storage of the device configuration parameter inside the secure memory and inside the IC.

2. The method of claim 1, wherein the secret key derivation parameters include a manufacturer configuration parameter (MCP) and a manufacturer diversification parameter (MDP).

3. The method of claim 1, wherein providing a secure memory further comprises the secure memory further enabling the third entity to generate the PSP using an additional secret key derivation parameter that is unknown to the first entity.

4. The method of claim 1, wherein the third entity is a device manufacturer and the second entity is a contract manufacturer of the device, wherein the device is characterized as being an internet of things device.

5. The method of claim 1, further comprising:
   using a firmware signature verification key (FSK) to verify firmware for the device;
   using the FSK as an input parameter for generation of the private key; and
   using the FSK for the generation of the signed public key certificate.

6. The method of claim 1, wherein enabling the storage of the device configuration parameter inside the IC further comprises burning fuses in the IC for storing the device configuration parameter.

7. The method of claim 1, wherein the device configuration parameter is used for the generation of the signed public key certificate, and wherein the device configuration parameter is used in the device for one or more of enabling/disabling a debug mode, enabling/disabling a secure boot, enabling/disabling encryption of a memory element, and enabling/disabling a modification of device configuration.

8. The method of claim 1, further comprising making the signed public key certificate available on a database.

9. The method of claim 1, wherein the secure memory is characterized as being one of a smartcard or a hardware security module (HSM).

10. The method of claim 1, wherein the UID is determined using the KDD and a private key known only to the first entity.

11. The method of claim 1, further comprising:
    digitally signing, by the first entity, the UID; and
    enabling the secure memory to verify the UID by verifying a signature.

12. The method of claim 1, wherein the secret key derivation parameters are characterized as being elliptic curve key pairs and the method used to generate the private key is characterized as being elliptic curve Diffie-Hellman.

13. A method comprising:
    manufacturing, by a first entity, an integrated circuit (IC) for use in a device, the IC having a unique identifier (UID) and secret key derivation data (KDD);
    providing the IC to a second entity for manufacturing the device using the IC, the IC being enabled by the first entity to generate a private key based on the KDD and a product specific parameter (PSP), the PSP being provided by a third entity;

enabling the third entity to prepare one of a signed public key certificate or certificate signing request using the UID, the signed public key certificate corresponding to the private key, wherein the first, second, and third entities are different entities; and enabling receipt of a device configuration parameter by the third entity, the device configuration parameter arranged to generate the private key inside the IC, arranged to generate the private key inside a secure memory, and arranged to generate the signed public key certificate; and enabling storage of the device configuration parameter inside the secure memory and inside the IC, wherein the device configuration parameter is used for the generation of the signed public key certificate, and wherein the device configuration parameter is used in the device for one or more of enabling/disabling a debug mode, enabling/disabling a secure boot, enabling/disabling encryption of a memory element, and enabling/disabling a modification of device configuration.

14. The method of claim 13, further comprising:
digitally signing, by the first entity, the UID; and
enabling the second entity to verify the UID by verifying a signature loaded in a secure memory.

15. The method of claim 13, wherein the third entity is a device manufacturer and the second entity is a contract manufacturer of the device manufacturer, and wherein the device is characterized as being an internet of things (IoT) device.

16. The method of claim 13, further comprising:
using a firmware signature verification key (FSK) to verify firmware for the device;
using the FSK as an input parameter for generation of the private key; and
using the FSK for the generation of the signed public key certificate.

17. The method of claim 13, wherein enabling the storage of the device configuration parameter inside the IC further comprises burning fuses in the IC for storing the device configuration parameter.

* * * * *